United States Patent [19]
Hayward

[11] 3,949,218
[45] Apr. 6, 1976

[54] LAMP ASSEMBLY

[75] Inventor: Walter W. Hayward, Loveland, Colo.

[73] Assignee: Super Vacuum Mfg. Co., Inc., Loveland, Colo.

[22] Filed: Apr. 28, 1975

[21] Appl. No.: 572,465

[52] U.S. Cl. .................. 240/67; 240/3; 240/36
[51] Int. Cl.² ........................................ F21V 21/14
[58] Field of Search............ 240/62 R, 62 A, 67, 62, 240/54, 64, 3, 36; 212/46 R, 46 A, 46 B, 55; 214/660

[56] References Cited
UNITED STATES PATENTS

| | | | |
|---|---|---|---|
| 2,740,039 | 3/1956 | Phillips | 240/67 X |
| 3,109,541 | 11/1963 | Matson | 212/55 X |
| 3,381,118 | 4/1968 | Widner | 240/3 |
| 3,495,364 | 2/1970 | De Bella | 52/118 |
| 3,586,270 | 6/1971 | Loffler et al. | 240/67 X |

*Primary Examiner*—Ulysses Weldon
*Attorney, Agent, or Firm*—Hugh H. Drake

[57] ABSTRACT

A bank of high-intensity lamps is carried atop an emergency vehicle or the like. The bank is coupled to the upper end of a mechanical actuator in a manner to permit both rotation of the bank about a vertical axis and tilting of the bank between generally upright and horizontal orientations. Another mechanical actuator is employed for the purpose of raising and lowering the bank along with the first actuator. Various electrical circuitry controls and emplements lamp energization and signalization or interlocking with respect to different movements of the bank of lamps.

22 Claims, 9 Drawing Figures

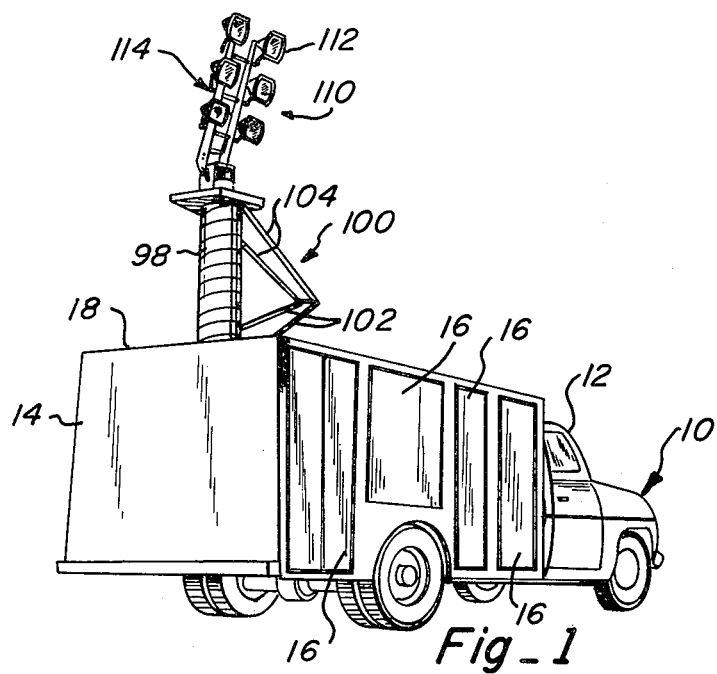
Fig_1
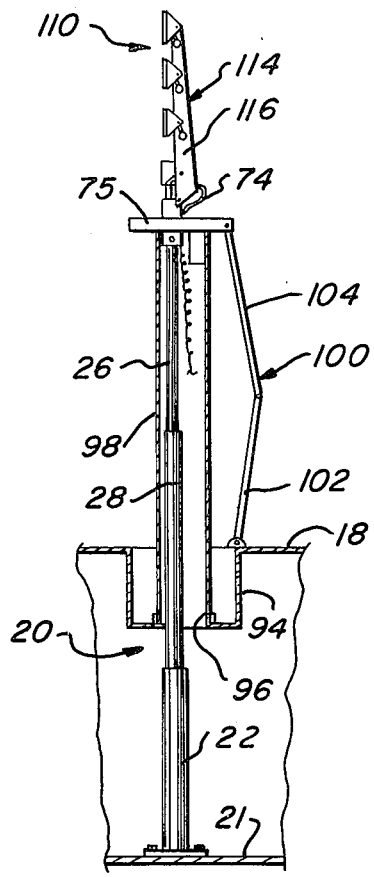
Fig_2
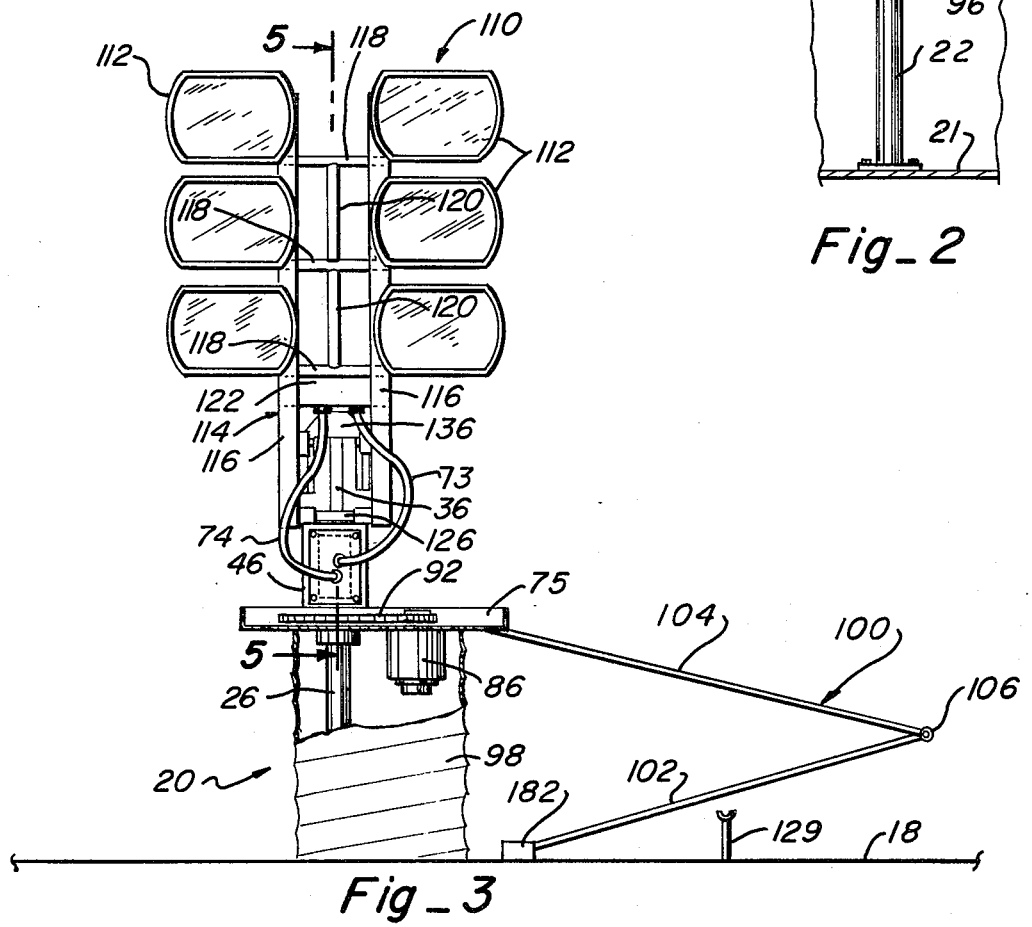
Fig_3

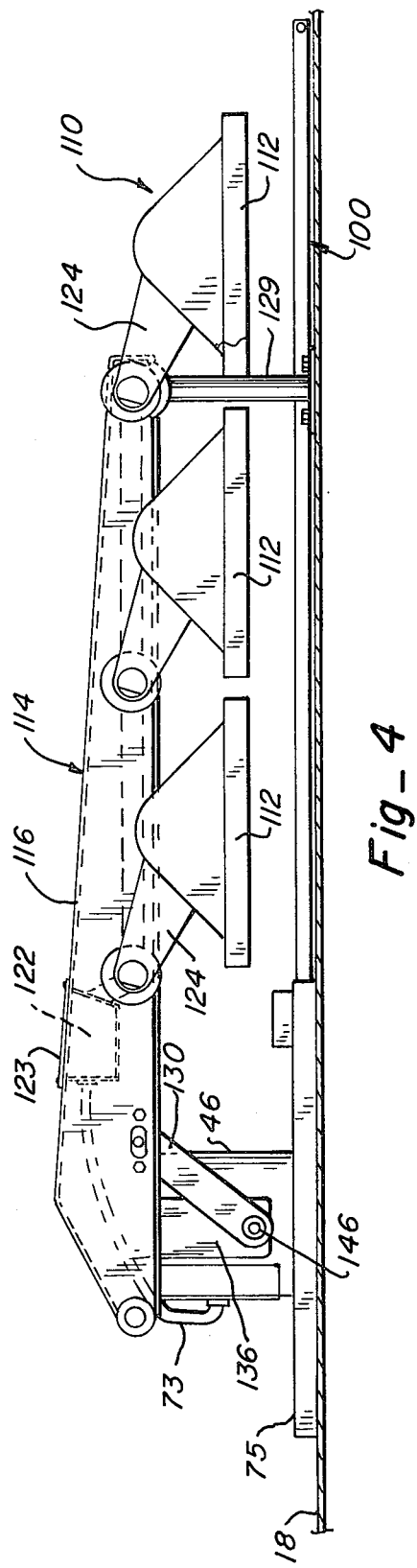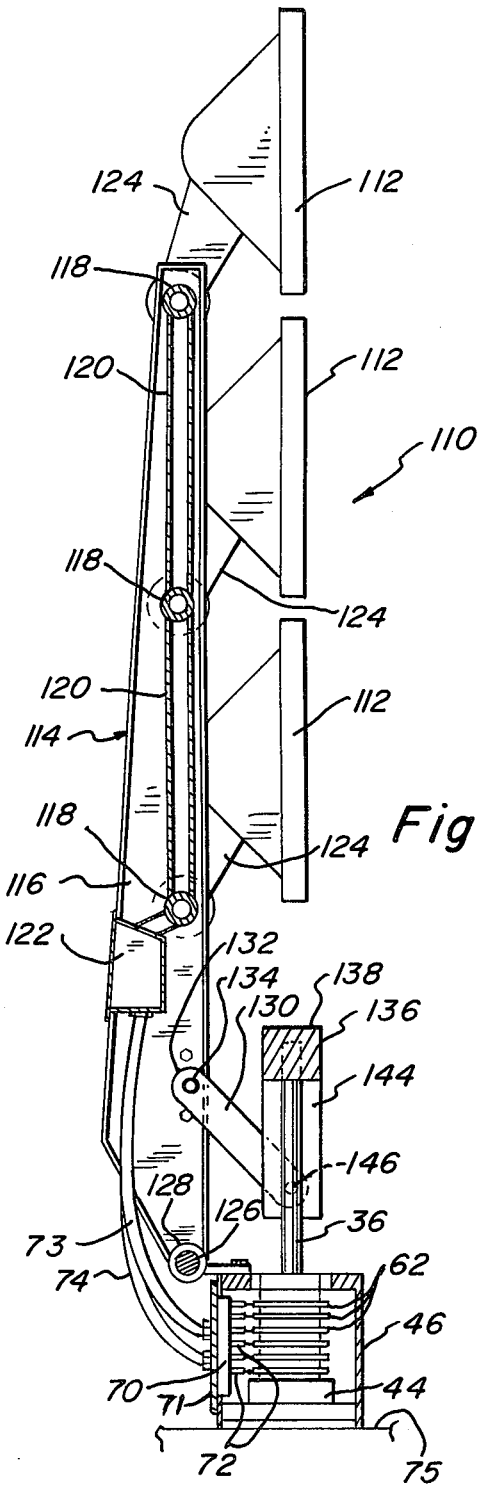

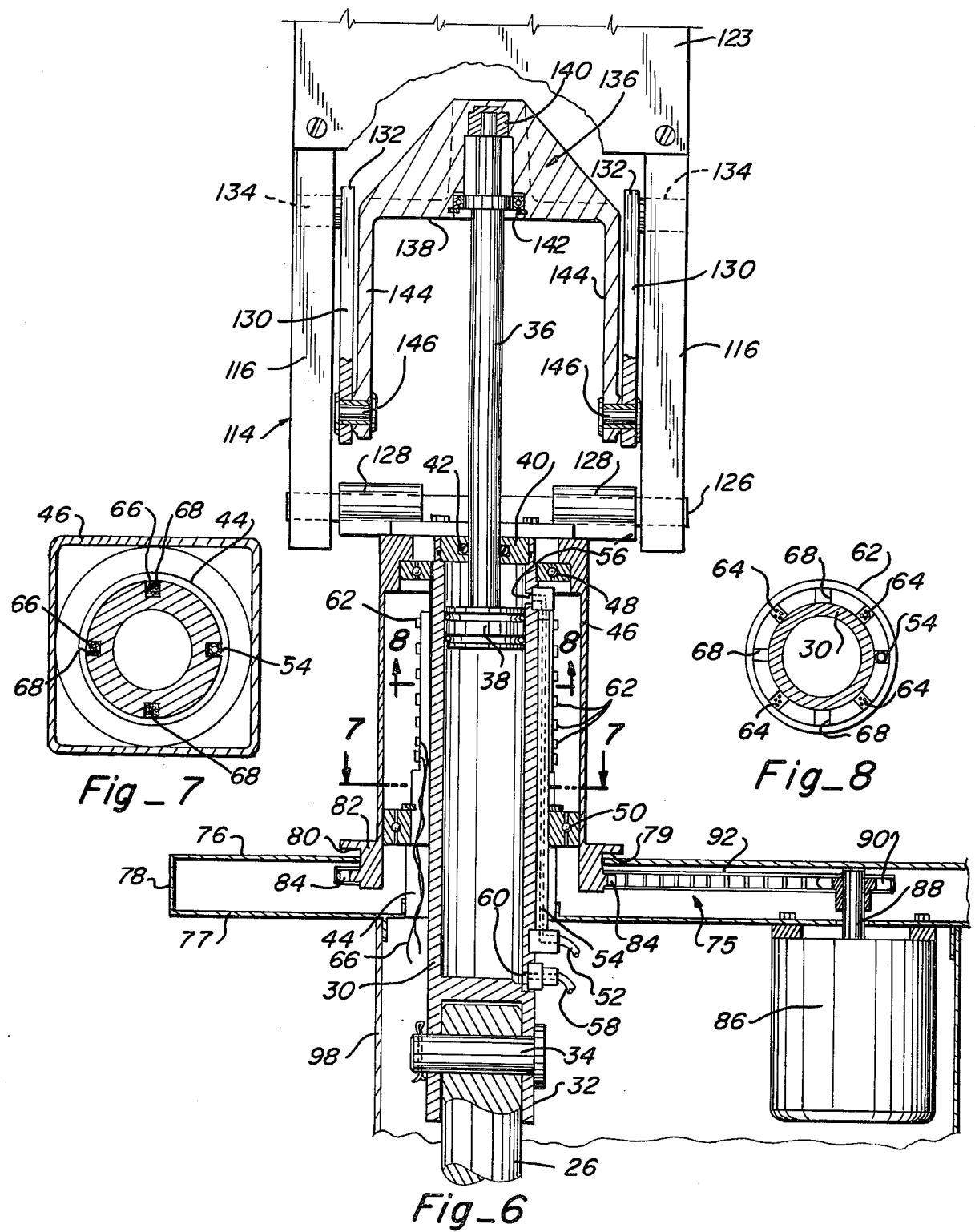

LAMP ASSEMBLY

The present invention pertains to a lamp assembly. More particularly, it relates to a lamp assembly that in use affords a high degree of flexibility in movement and orientation.

Particularly in connection with outdoor operations of various sorts at night, a transportable source of illumination often is highly desirable. Such operations might include any of a variety of activities exemplified by fire-fighting, search and rescue and efforts and construction. For such purposes, one or more lamps mounted atop powered vehicles or trailers have been found to be beneficial. In other cases, portable standards of different kinds have been used.

Often it is desired that the lamps be capable of being raised to a comparatively substantial height in order to illuminate a large area. Accordingly, different approaches, telescoping or otherwise, have been employed so as to permit raising the height of the lamps after arrival and initial deployment. Mounting supports of this sort have also been arranged so as to permit orientation to different positions.

Because, in use, the lamps become very hot, a number of prior supports have included means for varying that orientation even while the lamps are energized.

In some cases, prior structures for the general purpose at hand have been found to be unduly complex either in terms of manner of manipulation or cost of manufacture. In other cases, the structural approach has imposed limitations on the flexibility of orientation of the lamps once readied for operation. A review of the prior art will reveal that it is replete with what are at best awkward mechanisms.

It is, accordingly, a general object of the present invention to provide a new and improved lamp assembly which overcomes deficiencies and disadvantages present in assemblies heretofore known for the same general purpose.

Another object of the present invention is to provide a new and improved lamp assembly which is specifically capable of compact storage during transport while yet providing highly flexible orientation capabilities when in use.

A specific object of the present invention is to provide a new and improved lamp assembly which is capable of being vehicularly mounted while yet retaining and exhibiting a high degree of flexibility in use.

A further object of the present invention is to provide a new and improved lamp assembly which involves the use of only simply shaped and formed components while yet resulting in an overall structure which is rugged and dependable.

A lamp assembly constructed in accordance with the present invention includes an upright raising mechanism. Included in the mechanism is a shaft extendable upwardly beyond the upper end of the mechanism. Disposed above the upper end of the mechanism is a lamp support frame that carries at least one lamp. Fulcrum means for journaling one margin of the frame effectively from the upper end of the mechanism serve to permit the frame to be swung between an upright orientation and a horizontal orientation. A link arm is pivotally coupled at its one end to a portion of the frame spaced from the one margin thereof and also is pivotally coupled at its other end to the upwardly projecting end portion of the shaft. Power is supplied to the mechanism to effect longitudinal movement of the shaft and consequent pivoting of the link arm so as to swing the frame about the fulcrum means. As will be described and claimed in more detail, numerous other inventive features are set forth.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of an emergency vehicle which transports and supports a lamp assembly constructed in accordance with the present invention;

FIG. 2 is a fragmentary cross-sectional view of a portion of the apparatus shown in FIG. 1 and with certain of the components in different operative positions;

FIG. 3 is a fragmentary side-elevational view of a portion of the apparatus shown in FIGS. 1 and 2, partially broken away and with certain of the components in still different positions;

FIG. 4 is a fragmentary side-elevational view of generally the same apparatus featured in FIGS. 2 and 3 but again with certain principal components in still-different relative positions;

FIG. 5 is a fragmentary cross-sectional view taken along the line 5—5 in FIG. 3;

FIG. 6 is a fragmentary cross-sectional view of a portion of the apparatus shown in FIGS. 1–5 and taken from the same viewing angle as is FIG. 3;

FIG. 7 is a fragmentary cross-sectional view taken along the line 7—7 in FIG. 6;

FIG. 8 is a fragmentary cross-sectional view taken along the line 8—8 in FIG. 6.

Figure 9:
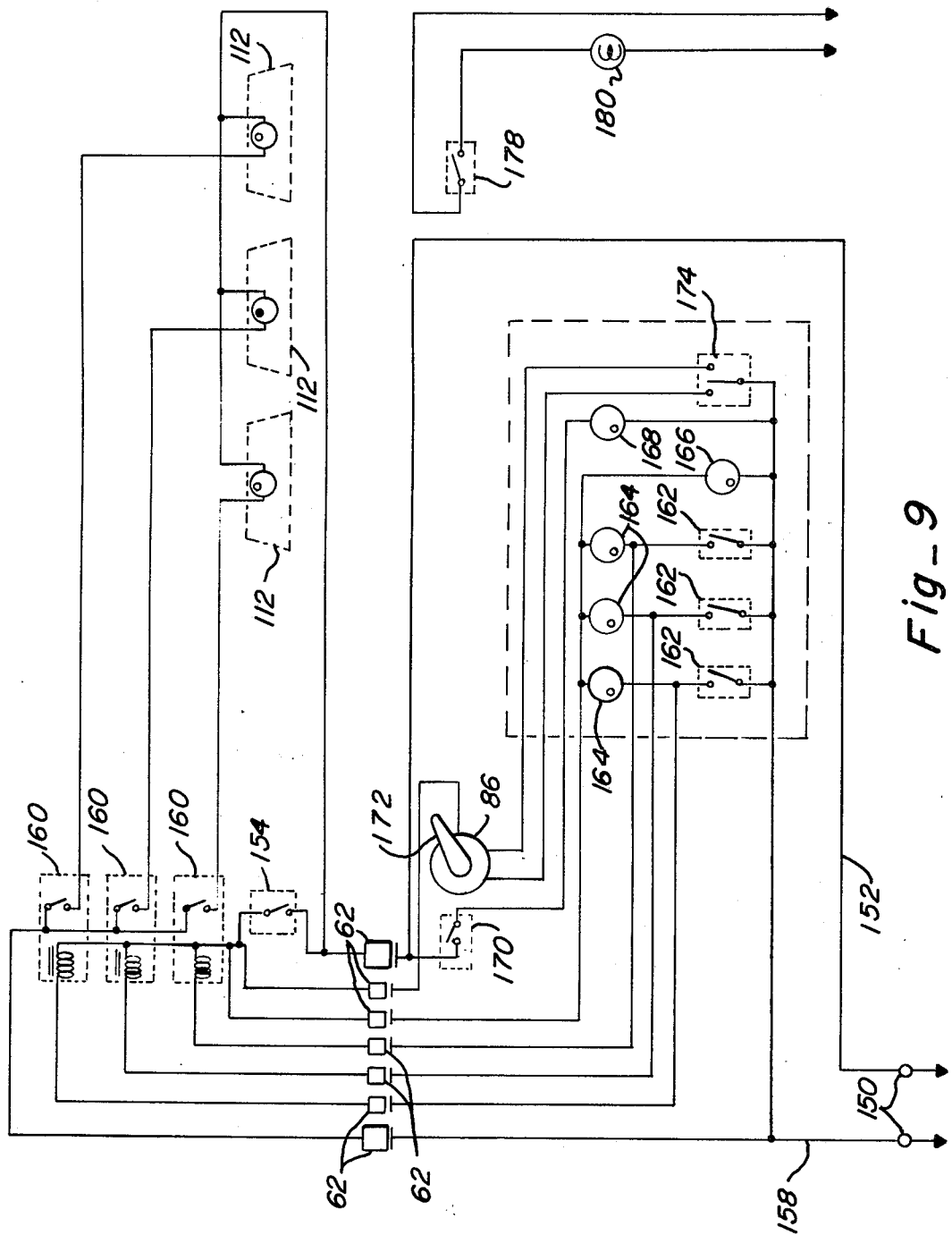
FIG. 9 is a schematic diagram of an electrical control and indication system employed in conjunction with the apparatus shown in FIGS. 1–8.

While the apparatus of the present invention is capable of advantageous utilization in a wide variety of applications and situations, it is illustrated herein in connection with an emergency vehicle. Thus, an emergency vehicle 10 is of a kind for use by such organizations as fire departments, law enforcement units and rescue groups. Alternatively, vehicle 10 may be equipped for use by persons engaged in construction, installation or repair. Thus, vehicle 10 includes a cab 12 behind which is mounted a van-type enclosure 14. A plurality of doors 16 permit access to respective different compartments defined within enclosure 14 for the purpose of accommodating various equipment. As prepared for use by a fire department, for example, such equipment may include an electric generator, a hydraulic system including a pump and controls, an air blower together with associated lengths of flexible duct, a sump pump, a compressed-gas recharging system and various auxilliary equipment such as cutting wheels, tree trimmers, jack hammers, impact wrenches and other tools which may be operated either separately or by means of hydraulic or electric power developed by apparatus contained within the vehicle itself.

The top or ceiling of enclosure 14 constitutes a platform 18 upon which may be mounted such usual items as flashing lights, a loudspeaker and radio antennas. An upright raising mechanism 20 is firmly secured at its lower end to a rigid floor 21 of enclosure 14 or a similarly positioned frame member of the vehicle chassis. In practice, raising mechanism 20 may be any of a variety of mechanical actuators that effect at least a component of linear movement. Examples include rack and pinion units, screw or worm drives and linear electric devices. As specifically illustrated herein, a hydraulic cylinder and piston arrangement is utilized. Thus, it is the lower end of a hydraulic cylinder 22 which is affixed to floor 21. Projecting upwardly beyond the upper end of cylinder 22 is a shaft 26. Shaft 26 is at least effectively connected or coupled to a piston operatively disposed within cylinder 22.

In the specific case shown, a two-stage piston assembly is employed so as to permit shaft 26 to be sufficiently withdrawn downwardly that its upper end is positioned at or below the level of platform 18 while yet permitting elevation of the upper end of shaft 26 to a position spaced above platform 18 by a distance significantly greater than the actual physical length of shaft 26 as shown. Thus, shaft 26 is in actuality affixed to a piston operatively disposed within an intermediate hydraulic cylinder 28 which in turn constitutes another piston shaft connected to its own piston operatively disposed within cylinder 22. Of course, the number of intermediate hydraulic or mechanical sections to be employed in a given installation, if any, depends upon a consideration of the ultimate height to which the upper end of shaft 26 is to extend in view of the vertical storage height available within enclosure 14 when the system is fully withdrawn or collapsed. For present purposes, intermediate cylinder 28 can simply be considered as being a telescoping extension of either shaft 26 or lower cylinder 22.

As best seen in FIG. 6, another raising mechanism is disposed in an upright position above the upper end of shaft 26. While the same alternatives are available in practice, here again a hydraulic arrangement is specifically embodied for purposes of illustration. Projecting downwardly from the lower end of a hydraulic cylinder 30 is an integrally affixed sleeve 32 which fits snugly upon the upper end of shaft 26. A pin 34 is inserted through aligned openings in sleeve 32 and the upper end portion of shaft 26, cylinder 30 thus being secured firmly upon the upper end of shaft 26.

Projecting upwardly beyond the upper end of cylinder 30 is a shaft 36 affixed at its lower end to a piston 38 operatively disposed within cylinder 30. In the usual manner, the upper end wall 40 of cylinder 30 includes a seal 42. Disposed in encircling relationship to at least a substantial portion of the length of cylinder 30 is a sleeve 44. Sleeve 44 may be either a separate component firmly secured upon cylinder 30 or an integral radially-extending portion of the wall of cylinder 30. In any case, sleeve 44 is formed to have several longitudinally-spaced steps of different respective diameters together with a plurality of longitudinal channels all for purposes about to be described.

Journalled for rotation around cylinder 30 is a housing 46. Housing 46 is mounted at its upper end from cylinder 30 by a bearing assembly 48. At its lower end, housing 46 is mounted from a step on sleeve 44 by a bearing assembly 50. One path for hydraulic fluid flow extends from a hose 52 through a conduit 54 disposed alongside the wall of cylinder 30 in a channel formed in sleeve 44 and terminating in a port 56 leading to the interior of cylinder 30 at its upper end. A reverse hydraulic fluid flow path leads from a hose 58 to a port 60 that communicates with the interior of cylinder 30 at its lower end.

Successively spaced along and encircling cylinder 30 are a series of electrical slip rings 62. The slip rings are secured to insulating bars 64 affixed within corresponding channels formed in sleeve 44 so as to be spaced circumferentially around the periphery of cylinder 30. Individual conductive wires 66, distributed to lie within different ones of additional channels 68 formed in and spaced around the circumference of sleeve 44, respectively connect to the different ones of slip rings 62. A panel 70 (FIG. 5) of insulating material is affixed to a removable cover 71 that closes an opening in one portion of the wall of housing 46. Projecting inwardly from panel 70 are a plurality of electrical contact fingers 72 that individually extend into wiping contact with respective different ones of slip rings 62. Contacts 72 connect to corresponding wires led from housing 46 by means of flexible conduits 73 and 74.

Carried from the lower end of sleeve 44, or otherwise mounted from the lower end portion of cylinder 30, is a horizontally-oriented chamber 75 having rigid top and bottom walls 76 and 77 and side walls 78. The margin 79 of an opening in top wall 76 is received within a circumferential recess 80 formed into the periphery of an outwardly-projecting wheel-rib 82 around the periphery of the lower end of housing 46. Although not specifically shown, a weather seal may be disposed beneath the upper rim of recess 80 and around margin 79. A sprocket 84 is fastened to the lower rim of wheel-rib 82 so as to provide a succession of peripherally spaced gear teeth. Suspended beneath lower wall 77 and spaced to one side of cylinder 30 is an electric drive motor 86; if desired, a hydraulic motor could be substituted. The motor shaft 88 projects upwardly through an opening in bottom wall 77 and carries at its upper end a driving gear 90. A drive chain 92 extends around wheel-rib 82 and driving gear 90 in engagement with respective teeth of each; alternatively, a direct gear drive may be used. In any case, rotation of motor shaft 88 serves to cause revolution of housing 46 around the longitudinal axis of cylinder 30.

Referring particularly to FIG. 2, projecting downwardly from platform 18 is a well 94. The raising system components extending upwardly from lower cylinder 22 project through an opening 96 in the bottom of well 94. Depending downwardly from lower wall 77 of chamber 75 is a longitudinally collapsible sleeve 98 the lower end of which is secured around the margin of opening 96 in the bottom of well 94. Sleeve 98 preferably is formed of a material such as a weather-resistant coated fabric carried upon an elongated spiral of resilient wire. The depth of well 94 is sufficient to accept and contain sleeve 98 when fully collapsed upon full withdrawal of shaft 26 downwardly whereupon chamber 75 rests on top of platform 18 as shown in FIG. 4.

Respectively coupled between uppermost cylinder 30 and platform 18 is a scissors 100 that serves to prevent rotation of cylinder 30, and that which is affixed to it such as chamber 75, relative to platform 18 while yet permitting vertical movement of cylinder 30 and the apparatus which it carries relative to platform 18. Scissors 100 include lower legs 102 and upper legs 104. At their upper ends, legs 104 are pivotally coupled directly on the underside of chamber 75 and thus indirectly to the lower end of cylinder 30. Legs 102 are pivotally coupled at their lower ends to platform 18. The other ends of each of legs 102 and 104 are intercoupled pivotally upon a pivot shaft 106. As the upper end of shaft 26 is moved vertically, scissors 100 thus assumes various different degrees of extension as illustrated by comparing the different positions depicted in FIGS. 1 through 4.

Disposed generally above uppermost cylinder 30 and chamber 75 is a lamp bank 110 which, in this case, includes a plurality of individual lamps 112 supported in a distributed array from a frame 114. Each of lamps 112 preferably is of a kind that provides extremely-high-intensity illumination such as those of the quartz-iodine variety.

In the particular form illustrated, frame 114 includes a pair of laterally-spaced elongated booms 116 having a channel-shaped cross-section. Disposed laterally through the booms so as to project from both outer sides are a plurality of cross-rods 118. Individual different ones of lamps 112 are mounted on the respective outer end portions of rods 118. Pipe sections 120 are disposed in parallel relationship between booms 116 and interconnect the corresponding different ones of cross rods 118. At the location of the lower one of cross rods 118, as viewed in FIG. 3, is a relay box 122. Cables 73 and 74, which originate from panel 70 that supports contacts 72, enter into one wall of box 122. Desirably, relay box 122 is in itself open on one side but protected by a removable cover 123. Pipes 120 and cross rods 118 preferably are hollow so as to contain individual conductive wires leading from relay box 122 to different ones of lamps 112. Desirably, those wires are led into lamps 112 from the end portions of cross rods 118 by way of support arms 124 that serve to clamp the different ones of lamps 112 on the respective ends of rods 118.

Secured between the lower end portions of spaced booms 116, as viewed in FIGS. 3 or 5, is a pivot rod 126. Affixed rigidly to and upon the upper end of housing 46 and to one side of shaft 36 are a pair of aligned bearing sleeves 128. Sleeves 128 receive pin 126 so that what constitutes a margin of frame 114 is journalled in the manner of a fulcrum effectively from the upper end of cylinder 30. Consequently, frame 114 may be swung between what is a generally upright orientation as shown in FIG. 5 and that which is a horizontal orientation as shown in FIG. 4. Projecting upwardly from platform 18 desirably is a stand or cradle 129 so positioned as to be disposed in the path of the outermost one of cross rods 118 as frame 114 is lowered to its horizontal orientation as shown in FIG. 4. Stand 129 thus serves as a rest for frame 114 when the latter is in its folded-down position.

A pair of link arms 130 are respectively pivotally coupled at their one ends 132 to respective ones of booms 116. Accordingly, pivot pins 134 project inwardly into rotative engagement with ends 132 of arms 130 from positions on respective ones of booms 116 that are spaced inwardly from the margin of frame 114 defined essentially by pivot pin 126. The other ends of each of arms 130 are pivotally coupled indirectly to the upwardly-projecting end portion of shaft 36. In more detail, a yoke 136 is situated with its bite portion 138 coupled to and for rotation around the upper end of shaft 36 by means of a thrust bearing 140 and a radial bearing 142 mounted on the upper end portions of shaft 36. Yoke 136 includes a pair of legs 144 that project downwardly individually along respective opposite sides of shaft 36. The lower end portion of each of legs 144 is pivotally coupled by means including a pin 146 to the respective ends of arms 130 remote from pins 134.

In operation, upward extension of shaft 36 from an initially downwardly-withdrawn position serves to transmit force through yoke 136 and arms 130 so as to cause frame 114 to begin to swing away from its horizontal position, as shown in FIG. 4, and about its fulcrum as defined by pin 126. As frame 114 continues in its movement away from its horizontal position, pins 134 are free to travel in an arc which extends over a highest-center position. With continued extension of shaft 36, pins 134 are driven in that same arc so as to travel downwardly on the other side of the high-center position until frame 114 reaches a reclined position beyond the upright orientation as shown in FIG. 5. Accordingly, it will be observed that the laterally-spaced position of the fulcrum defined by pin 126 relative to the axis of shaft 36, the spacing of pins 134 at one end of arms 30 from the lower margin of frame 114, the length of arms 130 and the lengths of legs 144 all are chosen so that, as frame 114 is swung between its generally upright orientation and its horizontal orientation, ends 132 of arms 130 swing through and beyond a highest-center position. By reason of such chosen arrangement of its different dimensions and distances, frame 114 may be swung through an angle of greater than 90° while yet requiring but conveniently short fulcrum and link arm spacings so that the resultant assembly necessary to drive frame 114 in its swinging movement is exceedingly compact. With different dimensions and spacings relatively comparable to those actually shown in the drawings, frame 114 may be readily swung between its horizontal orientation and a generally upright orientation angularly displaced by about 100°.

A preferred electrical energization, control and indication system is depicted in FIG. 9. Primary power, as from an engine-driven electrical generator, is available at terminals 150. One of terminals 150 is connected to a common 152 which extends through one of slip rings 62 to one side of a tilt switch 154 as well as to one side of each of a plurality of lamps 112. The other one of terminals 150 is connected by a "hot" line 158 through another of slip rings 62 to one switch terminal of each of a plurality of relays 160. The others of each of the switch terminals in relays 160 are individually connected to respective different ones of the other sides of lamps 112. It may be noted that only three lamps 112 are shown in FIG. 9 while a total of six lamps are depicted in some of the other figures. Of course, the total number of lamps to be included on frame 114 is a matter of choice. Generally, it is desirable that the operator be able to energize less than all of the lamps at any given time in order that he might be able to reduce total energy consumption whenever less than maximum illumination is required. For illustrative purposes, then, the layout in FIG. 9 assumes that a total of six lamps as shown in others of the figures are to be selectively energizable in groups of two. Accordingly, only three relays 160 are shown, those relays desirable being contained within relay box 122.

One side of the solenoid in each of relays 160 is connected respectively through an individually different one of slip rings 62 to one side of a respective manually-operable switch 162. The other side of each of switches 162 is connected to hot line 158, while the other side of each of the solenoids in relays 160 is connected through switch 154 to common 152. Also extending from that other side of each of the solenoids in relays 160 is a conductive path that extends through still another one of slip rings 62 to one terminal of each of a plurality of neon indicator lights 164 the other terminals of which connect to the terminals of switches 162 that feed power through the slip rings to the solenoids. Bridging indicators 164 and switches 162 is a bank-ready neon indicator 166.

Having one terminal connected to common 152 and its other returned through an indicator lamp 168 to hot line 158 is a rotational-position sensing switch 170. Switch 170 has its actuating element disposed in the path of an arm 172 associated with housing 46, as by being physically affixed to project from the wall of housing 46, so that its contacts close and thus energize indicator 168 at such time as lamp frame 114 has been rotated to a position which enables the latter to be swung downwardly to its rest position in engagement with support 129. Motor 86, that drives housing 46 in revolution, has a pair of leads that connect to respective output terminals of a reversing switch 174 the selection terminal of which is returned to hot line 158. Thus, switch 174 may be manually operated so as to drive motor 86 in either direction and control the rotation of the lamp assembly.

A switch 178 is utilized to provide an indication, such as in the cab of vehicle 10, which signals to the operator that the lamp assembly is in its storage position or at least in other than its fully vertically-extended position. Thus, the terminals of switch 178 are connected in series with an indicator lamp 180 to the respective terminals of a source of power such as the vehicle battery. Since switch 178 is to be responsive to downward movement of the lamp frame, it may have its switch operator disposed in the path of any portion of the vertically moveable assembly. Conveniently, switch 178 may be mounted in cradle 129 so as to be operated by the associated one of cross rods 118. Alternatively, switch 178 may be located within a housing 182 at the lower end of one of scissors legs 102 and so situated as to be actuated by that leg upon the beginning of collapse of scissors 100.

Tilt switch 154 is located on lamp frame 114, preferably within relay box 122. Desirably, switch 154 is of the mercury type. In any event, it is responsive to the tilt angle of frame 114 as the latter is swung toward its horizontal orientation so as to break the common return for each of the solenoids 160 and thus disable or preclude the energization of any of lamps 112 whenever the lamps, on being swung downwardly, approach too closely to platform 18. As specifically embodied, switch 154 opens when frame 114 is swung to less than an angle of 45° relative to platform 18.

Tilt switch 154 also is connected by way of yet another slip ring 62 so as to be electrically disposed in the path of the common return for motor 86. Thus, switch 154 serves to disable operation of motor 86 after lamp frame 114 has begun to swing downwardly to its storage position. This precludes any attempt to cause rotation about the vertical axis of the lamp assembly when it is close to or resting in its downward storage position. In one alternative, a separate switch, operated in the same manner as switch 178, has been employed for opening the common return of motor 86 as the lamp assembly is lowered.

In overall operation, the lamp assembly normally is transported in its storage position as shown in FIG. 4. Upon arrival at the scene, the equipment operator usually will first initiate operation of the conventional pump carried within enclosure 14 so as to develop hydraulic power. At the same time, he desirably will place into operation the also-included electric generator. Ordinarily, conventional hydraulic controls will then be manipulated so as to cause shaft 36 to be extended and thereby effect the swinging of lamp frame 114 from its horizontal storage position to its operating generally-upright position. Thereafter, other conventional hydraulic controls are manipulated to raise the lamp frame to its desired operating elevation. Either before, during or after the last-described operation, one or more of switches 162 may be closed so as to energize a selected number of lamps 112 at any time after frame 114 has been swung upwardly from its storage position beyond the lower swing-limit as determined by switch 154. Switch 174 then may be manipulated to rotate the lamp bank about the general vertical axis of the assembly.

Upon conclusion of the operation, switch 174 is manipulated so as to rotate the lamp assembly to its proper position for storage at which time indicator 168 is energized. Thereafter, the hydraulic controls are manipulated so as both to lower the overall assembly from the elevated position downwardly and also to swing the lamp frame from its upright position down to its horizontal position. Should the operator fail to open switches 162 in advance, tilt switch 154 will insure that lamps 112 are extinguished prior to disposition of frame 114 in its horizontal orientation.

As suggested in FIG. 9, one pair of slip rings 62 preferably are of enlarged, heavy-duty type that carry the primary energy for lamps 112. The remaining slip rings, that provide for control as to which of the lamps are energized at any given time as well as affording signal-indication feedback, may be constructed so as to have substantially less current-curing capacity. Indicators 164 serve to signal to the operator which portions of the overall lamp bank are energized at any given time. Indicator 166 signals when the lamp bank is ready for energization. Indicator 168 signals that the lamp bank is in proper rotational position for lowering to its storage position.

Considering all of the foregoing description, it should become apparent that the disclosed lamp bank is capable of highly-flexible utilization and adaptation while at the same time being very compact in terms of the space required both within and above the vehicle or other supporting structure with which it is associated. Numerous details lead to advantageous combinations and dispositions of the various principal components. The resulting structure may be decidedly rugged while yet being capable of economical manufacture. In terms of usage in connection with emergency services, it is, of course, possible that apparatus such as this will be subject to damage from external forces. In that respect, the assembly is particularly attractive in that at least most of its individual components most likely to be damaged from such forces are of a kind which are either readily replaceable from normal local sources or easily repairable in facilities that normally are locally available.

For emergency services of the type contemplated, it is desirable that a source of hydraulic power be available for the operation of accessory equipment. For that reason as well as in the interest of incorporating compact and durable components, the specific embodiment herein described has employed hydraulic cylinders 22 and 30 as the raising mechanisms. As indicated, however, other raising mechanisms may be substituted.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A lamp assembly comprising:
an upright raising mechanism;
a shaft included in said mechanism and extendable upwardly beyond the upper end of said mechanism;
a lamp support frame disposed above the upper end of said mechanism;
at least one lamp carried by said frame;
fulcrum means for journaling one margin of said frame effectively from said upper end of said mechanism to permit said frame to be swung between an upright orientation and a horizontal orientation;
a link arm pivotally coupled at its one end to a portion of said frame spaced from said one margin thereof and pivotally coupled at its other end to the upwardly projecting end portion of said shaft;
and means for supplying power to said mechanism to effect longitudinal movement of said shaft and consequent pivoting of said link arm to swing said frame about said fulcrum means.

2. A lamp assembly as defined in claim 1 which further includes a yoke coupled at its bite portion to the upper end of said shaft and having a leg projecting downwardly alongside said shaft, said other end of said link arm being pivotally connected directly to the lower end portion of said leg.

3. A lamp assembly as defined in claim 2 in which said yoke is journaled on said upper end of said shaft for rotation axially around said shaft.

4. A lamp assembly as defined in claim 2 in which said yoke has a pair of legs projecting downwardly individually alongside respective opposite sides of said shaft, in which said other end of said link arm is pivotally connected directly to the lower end portion of one of said legs, and in which a second link arm is pivotally coupled at its one end to another portion of said frame spaced from said one margin thereof and is pivotally connected at its other end directly to the lower end portion of the other of said legs.

5. A lamp assembly as defined in claim 2 in which the position of said fulcrum means relative to the axis of said shaft, the spacing of said one end of said link arm from said one margin, the length of said link arm and the length of said leg all are chosen so that, as said frame is swung from said upright orientation to said horizontal orientation, said one end of said link arm swings through and beyond a highest-center position.

6. A lamp assembly as defined in claim 1 in which said mechanism includes a hydraulic cylinder and said shaft includes a piston operatively disposed in said cylinder.

7. A lamp assembly as defined in claim 1 which further includes means for automatically de-energizing said lamp whenever said frame is swung a predetermined amount from said upright orientation toward said horizontal orientation.

8. A lamp assembly as defined in claim 1 in which said fulcrum means includes a housing journaled on for rotation around said mechanism, and which further includes motive means drivingly connected to said housing for effecting rotation of said housing and said fulcrum means around said mechanism.

9. A lamp assembly as defined in claim 8 which further includes mutually-cooperating slip-rings and contacts respectively carried by said housing and said mechanism, means for coupling one of said slip-rings and contacts to said lamp, means for coupling the other of said slip-rings and contracts to a source of electrical power.

10. A lamp assembly as defined in claim 9 which includes a plurality of lamps carried by said frame;
in which a plurality of electrical relays are carried by said frame;
in which main electrical power for energizing said lamps is conducted through chosen ones of said slip-rings and contacts and individually different ones of said relays to respectively different ones of said lamps;
in which control electrical power for energizing individual different ones of said relays is conducted through respectively different others of said slip-rings and contacts;
and which further includes means for delivering control electrical power selectively to respective different ones of said others of said slip-rings and contracts.

11. A lamp assembly as defined in claim 9 in which said mechanism includes a hydraulic cylinder and said shaft includes a piston operatively disposed in said cylinder.

12. A lamp assembly as defined in claim 11 in which said housing is journaled directly on a hub in turn affixed around a portion of said cylinder below said slip-rings and contacts, in which a plurality of longitudinal channels are formed in and spaced around the circumference of said hub, in which a conduit for conducting hydraulic fluid to one end of said cylinder is disposed in one of said channels and extends radially inside said slip-rings and contacts, and in which electrically-conductive wires leading to said slip-rings and contacts are disposed at least in another of said channels.

13. A lamp assembly as defined in claim 8 which further includes:
a second upright raising mechanism disposed beneath the first mechanism;
a second shaft included in said second mechanism and extendable upwardly beyond the upper end of said second mechanism;
means for affixing the lower end of said first mechanism to the upper end portion of the shaft of said second mechanism;
and means for supplying power to said second mechanism to effect longitudinal movement of its said shaft and consequent vertical movement of said first mechanism and said frame.

14. A lamp assembly as defined in claim 13 in which said motive means is supported from said first mechanism and is thereby moved vertically along with said first mechanism and said frame.

15. A lamp assembly as defined in claim 13 which further includes a platform with respect to which said second mechanism is rigidly oriented and above which said first mechanism and said frame are located, and vertically-flexible means coupled between said platform and said first mechanism for preventing rotation of said first mechanism relative to said platform while permitting vertical movement of said first mechanism and said frame relative to said platform.

16. A lamp assembly as defined in claim 15 in which said flexible means includes a scissors with at least a pair of legs pivotally connected together at one end of each with the other end of one leg being pivotally coupled to said platform and the other end of the other leg being pivotally coupled to said first mechanism.

17. A lamp assembly as defined in claim 13 which further includes means responsive to a swing of said frame away from said upright orientation for disabling said motive means.

18. A lamp assembly as defined in claim 13 which further includes means responsive to movement of said first mechanism downwardly from an upward limit position for providing a warning indication to an operator of said assembly.

19. A lamp assembly as defined in claim 13 which further includes means responsive to revolution of said housing to a predetermining rotational position for providing a signal indication to an operator of said assembly.

20. A lamp assembly as defined in claim 13 which further includes a platform with respect to which said second mechanism is rigidly oriented and above which said first mechanism and said frame are located;
   an upwardly opening well defined in said platform and through which the shaft from said second mechanism effectively extends;
   a longitudinally-collapsible sleeve surrounding said second shaft from said second mechanism and extending from the bottom of said well to at least approximately the bottom end of said first mechanism when the shaft from said second mechanism is fully extended, with the depth of said well being sufficient to accept and contain said sleeve when fully collapsed upon full withdrawal of the shaft from said second mechanism.

21. A lamp assembly as defined in claim 13 in which said second mechanism includes a hydraulic cylinder and said second shaft includes a piston operatively disposed in said cylinder.

22. A lamp assembly as defined in claim 13 which further includes angle-sensitive means responsive to a swing of said frame a pre-selected amount away from said upright orientation for disabling the supply of energizing electrical power to said lamp.

* * * * *